Figure 1:
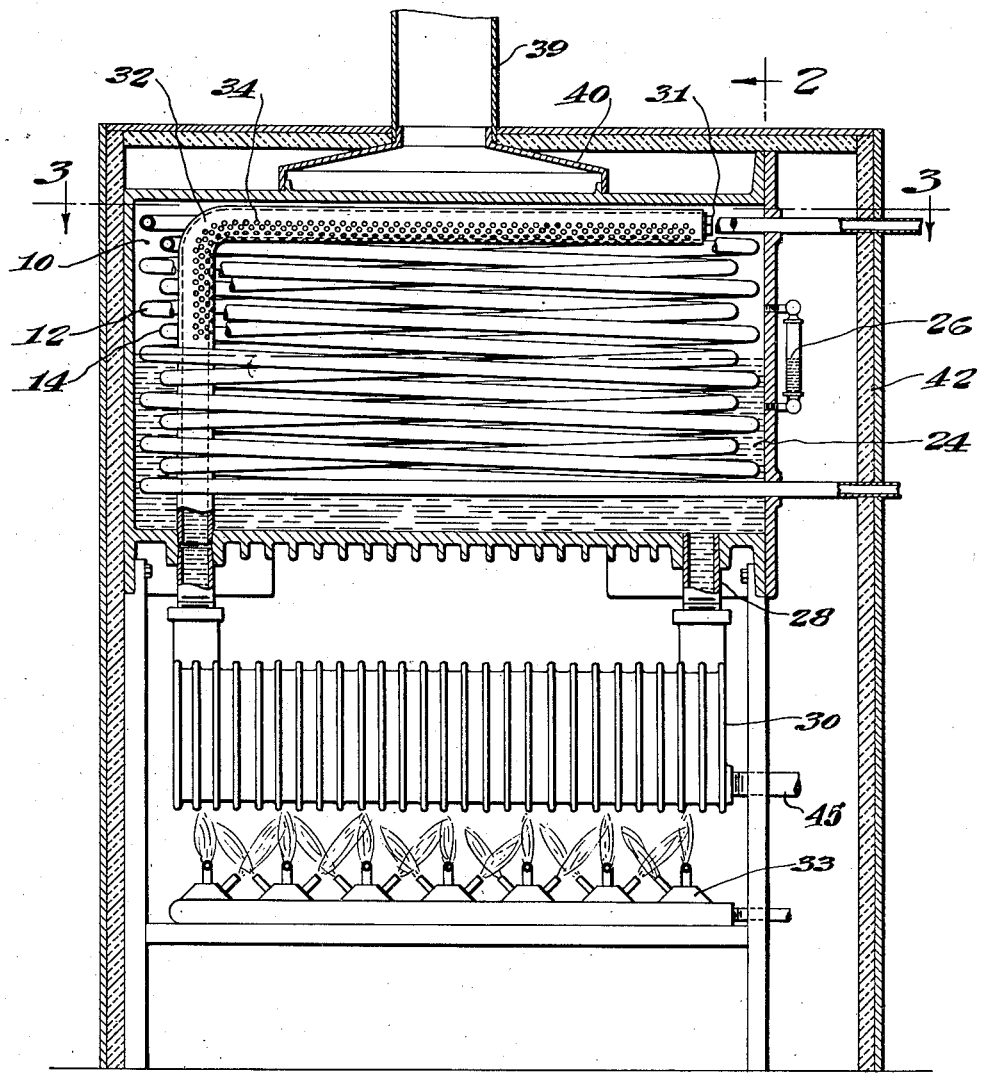

March 21, 1939.   A. B. HULTGREN   2,151,108

WATER HEATING APPARATUS

Filed Jan. 18, 1937   2 Sheets-Sheet 1

INVENTOR
Albert B. Hultgren
BY J. Stanley Churchill
ATTORNEY

March 21, 1939.　　A. B. HULTGREN　　2,151,108
WATER HEATING APPARATUS
Filed Jan. 18, 1937　　2 Sheets-Sheet 2
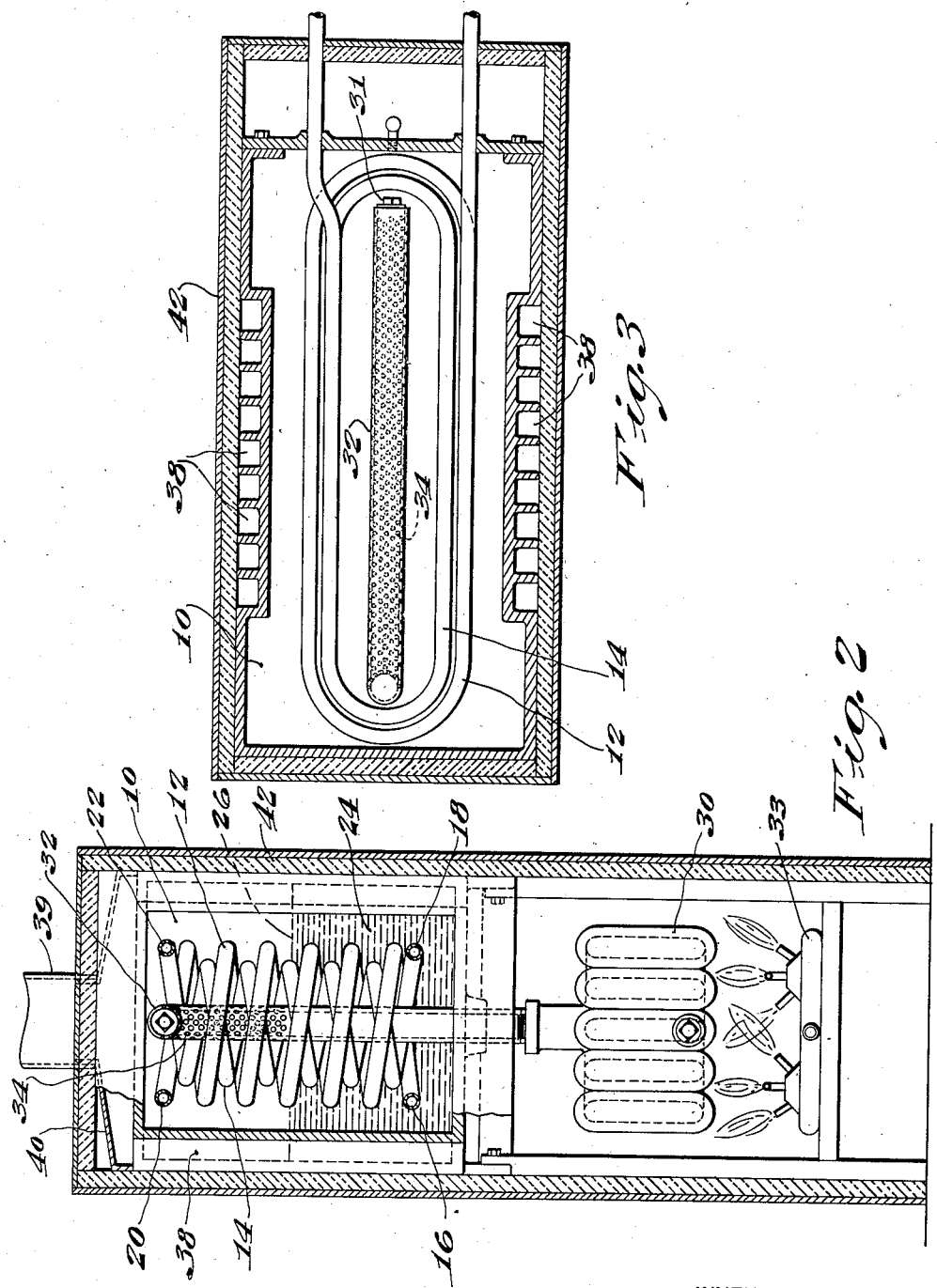
INVENTOR
Albert B. Hultgren
BY J. Stanley Churchill,
ATTORNEY Patented Mar. 21, 1939

2,151,108

UNITED STATES PATENT OFFICE 2,151,108

WATER HEATING APPARATUS

Albert B. Hultgren, East Milton, Mass.

Application January 18, 1937, Serial No. 121,086

3 Claims. (Cl. 122—33)

This invention relates to a water heating apparatus.

The object of the invention is to provide novel and improved water heating apparatus, which may be used with advantage in a hot water heater system for heating dwelling houses and the like, in heating hot water for domestic purposes, and also in its preferred form for heating the hot water to be supplied to the house heating system and to the domestic supply.

With this object in view and such others as may hereinafter appear, the invention consists in the water heating apparatus and in the various structures, arrangements and combinations of parts hereinafter described and particularly defined in the claims at the end of this specification.

In the drawings illustrating the preferred embodiment of the invention, Fig. 1 is a longitudinal sectional view of a water heating unit embodying the present invention; Fig. 2 is a vertical sectional view on the line 2—2 of Fig. 1; and Fig. 3 is a sectional plan view on the line 3—3 of Fig. 1.

In general the present invention contemplates a general utility water heater in which provision is made for transmitting heat from a source of supply of direct heat preferably in the form of a gas flame through the medium of a relatively small body of water which is generated into steam. The steam thus generated is arranged to heat by conduction one or more coils through which the water to be heated is circulated and the apparatus is preferably so designed that as the steam gives up its heat to the water to be heated, condensation of the steam takes place and the condensate is returned to the supply of water from which the steam is generated.

In the preferred and illustrated embodiment of the invention the coils, through which the water to be heated is circulated, are supported within a water chamber which is partially filled with water so that the coils are partially immersed in the body of water within the chamber. In the preferred form of the invention the body of water in the coil chamber is directly connected with a lower or heating chamber of relatively small capacity. The direct source of heat, such as a gas flame is directed against the lower chamber and the steam thus generated is ejected through perforations in a stand pipe extending upwardly from the lower chamber into the coil chamber and the perforations are arranged to direct the steam against the upper and unsubmerged portion of the coil or coils thus providing rapid heating of the water in the upper portion of the coils. The water is withdrawn from these coils and is consequently in a heated condition. The surplus heat from the gas flame after passing over the lower chamber is directed against the bottom of and along the sides of the coil chamber to heat the body of water in which the coils are partially immersed, thus effecting a maximum utilization of the heat with the result that rapid heating of the water and consequently rapid generation of steam is insured, and thus maximum efficiency is obtained together with the resulting economies in fuel consumption.

Referring now to the drawings, the illustrated heating unit comprises a water heating chamber 10 in which are supported two separate coils 12, 14 which are provided with inlets 16, 18 and outlets 20, 22. The coils 12 may and preferably will be connected to a hot water house heating system and the coils 14 may be connected to a storage tank for supplying hot water for domestic use. As herein shown, the water heating chamber 10 is partially filled with a body of water 24 to a level indicated at 26 so that approximately one half of the coils are immersed in the water within the chamber. Water is supplied to the coil chamber 10 and the heating chamber 30 through an inlet pipe 45 which may be provided with the usual control valve, not shown, for admitting water under pressure into the lower chamber 30 and upwardly through the connection 38 into the coil chamber until it reaches the level indicated at 26. In this manner the chamber 30 is filled and the water is permitted to rise in the stand pipe 32 until it reaches the level indicated. The body of water 24 is permitted to circulate from the chamber 10 through a connecting pipe 28 and into a lower heating chamber 30 of relatively small capacity and against which direct heat is provided by a gas plate 33. The other end of the lower chamber 30 is connected to a stand pipe 32 which extends upwardly into the chamber 10 and is bent at right angles to extend horizontally along the upper section of the heating chamber 10 and above the coils 12, 14. A plug 31 is provided at the end of the pipe. The pipe 32 is perforated along the horizontal run and also along the vertical run from the top down to a point just above the water line 26. The lower chamber 30 is constructed to hold a relatively small quantity of water so that in operation when direct heat is applied to the chamber 30 the water contained in it is rapidly brought to the boiling point and the steam thus generated passes upwardly through the stand pipe 32 and is ejected through the perforations 34 directly against the upper portion of the coils 12, 14. As illustrated in Figs. 2 and 3 the steam generating chamber 30 is corrugated to provide a maximum heating area. The direct heat from the gas flame after passing over the steam generating chamber 30 is directed against the bottom of the heating chamber 10 and upwardly along the sides of the chamber through open sections 38 to assist in raising the temperature of the body of water 24 within the chamber 10. The open sections 38 communicate with the flue 39 through a connection 40 at the top of the heating unit. As herein illustrated the heating unit is suitably enclosed within an efficient insulating casing 42 which reduces the heat loss to a minimum.

From the description thus far, it will be observed that water circulated through the coils is heated by the body of hot water within which the lower portion of the coils are submerged, and when being withdrawn, this hot water is further raised in temperature by the steam within the chamber above the water level therein, thus insuring a maximum heating of the water during its circulation through the coils. The flues 38 may be easily cleaned, and if desired the side plates of the casing may be removed to facilitate this operation.

While the preferred embodiment of the invention has been herein illustrated and described, the invention may be embodied in other forms within the scope of the following claims.

Having thus described the invention, what is claimed is:

1. A water heating apparatus having, in combination, a coil chamber partially filled with and containing a substantial quantity of water, a coil disposed in said chamber and partially immersed in the water therein and through which the water to be heated is circulated, a heating chamber disposed below the coil chamber containing a relatively small quantity of water, water inlet means connected with the coil and heating chambers, means for applying direct heat to the heating chamber and a stand pipe from the heating chamber having its upper end projecting into the coil chamber above the normal water level therein and provided with a horizontally extended portion disposed within said coil, said portion being provided with a plurality of perforations through which steam may be directed against substantially all parts of the upper portion of said coil.

2. A water heating apparatus having, in combination, a coil chamber adapted to be partly filled with water, a coil positioned in said chamber to be partly immersed in said water and through which water to be heated is circulated, a heating chamber positioned below said coil chamber and adapted to be filled with water, a connecting passageway between the lower portion of said coil chamber and said heating chamber to provide for flow of water from said coil chamber into said heating chamber, a conduit leading from the upper portion of said heating chamber into the upper portion of said coil chamber to deliver steam from said heating chamber into said coil chamber, said conduit being provided with means for distributing said steam throughout the upper portion of said coil chamber and for directing streams of said steam against said coil.

3. A water heating apparatus having, in combination, a coil chamber adapted to be partly filled with water, a coil positioned in said chamber to be partly immersed in said water and through which water to be heated is circulated, a heating chamber positioned below said coil chamber and adapted to be filled with water, a connecting passageway between the lower portion of said coil chamber and said heating chamber to provide for flow of water from said coil chamber into said heating chamber, a conduit leading from the upper portion of said heating chamber into the upper portion of said coil chamber to deliver steam from said heating chamber into said coil chamber, said conduit being provided with means for impinging jets of said steam against said coil.

ALBERT B. HULTGREN.